(12) United States Patent
Hain et al.

(10) Patent No.: US 12,126,148 B2
(45) Date of Patent: Oct. 22, 2024

(54) METHOD FOR MACHINING AT LEAST ONE ELECTRICAL ENCLOSURE

(71) Applicant: RITTAL GMBH & CO. KG, Herborn (DE)

(72) Inventors: Markus Hain, Dillenburg (DE); Heiko Holighaus, Eschenburg (DE); Siegfried Boehme, Wolfen (DE); Lars Martin, Münzenberg (DE)

(73) Assignee: RITTAL GMBH & CO. KG, Herborn (DE)

( * ) Notice: Subject to any disclaimer, the term of this patent is extended or adjusted under 35 U.S.C. 154(b) by 1015 days.

(21) Appl. No.: 17/048,734

(22) PCT Filed: Mar. 22, 2019

(86) PCT No.: PCT/DE2019/100274
§ 371 (c)(1),
(2) Date: Oct. 19, 2020

(87) PCT Pub. No.: WO2019/201377
PCT Pub. Date: Oct. 24, 2019

(65) Prior Publication Data
US 2021/0135434 A1    May 6, 2021

(30) Foreign Application Priority Data

Apr. 20, 2018 (DE) ...................... 10 2018 109 606.2

(51) Int. Cl.
*H01S 4/00* (2006.01)
*H02B 1/30* (2006.01)
(Continued)

(52) U.S. Cl.
CPC ............... *H02B 3/00* (2013.01); *H02B 1/301* (2013.01); *H02B 1/40* (2013.01)

(58) Field of Classification Search
CPC ............. H02B 1/301; H02B 1/40; H02B 3/00
See application file for complete search history.

(56) References Cited

U.S. PATENT DOCUMENTS 6,488,214 B1 * 12/2002 Nicolai .................. H02B 1/565
165/80.2
9,871,353 B2    1/2018 Boehme et al.
(Continued)

FOREIGN PATENT DOCUMENTS

DE         4438525 A1    5/1996
DE    102005046762 A1    4/2007
(Continued)

OTHER PUBLICATIONS

International Search Report (in English and German) and Written Opinion of the ISA (in German) issued in PCT/DE2019/100274, mailed Jul. 8, 2019; ISA/EP.

*Primary Examiner* — Paul D Kim
(74) *Attorney, Agent, or Firm* — Harness, Dickey & Pierce, P.L.C.

(57) ABSTRACT

The invention relates to a method for machining at least one switchgear cabinet including:
 providing at least one switchgear cabinet which is constructed in several parts and comprises at least one detachably mounted component;
 disassembling and removing the detachably mounted component from the switch cabinet;
 machining the disassembled and removed component and providing the machined component for reassembly on the associated switch cabinet; and
 re-assigning the machined component provided for reassembly to the corresponding control cabinet,
wherein the at least one switch cabinet has an individual machine-readable switch cabinet identification and the at least one removably mounted component has an individual
(Continued)

machine-readable component identification, which are assigned to one another, wherein re-assigning the component to the switch cabinet comprising machine-reading of the machine-readable identifications and bringing together the component and the switch cabinet which have the mutually assigned identifications.

15 Claims, 5 Drawing Sheets

(51) Int. Cl.
*H02B 1/40* (2006.01)
*H02B 3/00* (2006.01)

(56) References Cited

U.S. PATENT DOCUMENTS

| | | | |
|---|---|---|---|
| 10,207,377 | B2 | 2/2019 | Kienholz et al. |
| 10,277,014 | B2 | 4/2019 | Brueck et al. |
| 10,396,531 | B2 | 8/2019 | Reuter et al. |
| 10,553,055 | B2 | 2/2020 | Holighaus |
| 10,811,854 | B2 | 10/2020 | Boehme et al. |
| 2011/0187503 | A1 | 8/2011 | Costa et al. |
| 2014/0253289 | A1 | 9/2014 | Groth et al. |
| 2016/0352080 | A1 | 12/2016 | Brueck et al. |
| 2016/0352082 | A1 | 12/2016 | Boehme et al. |
| 2017/0259386 | A1 | 9/2017 | Kienholz et al. |
| 2018/0375302 | A1 | 12/2018 | Reuter et al. |
| 2019/0123524 | A1 | 4/2019 | Steinberger |
| 2019/0130680 | A1 | 5/2019 | Holighaus |
| 2019/0214798 | A1 | 7/2019 | Schindler et al. |
| 2019/0372316 | A1 | 12/2019 | Boehme et al. |
| 2020/0032561 | A1 | 1/2020 | Bruck |

FOREIGN PATENT DOCUMENTS

| | | |
|---|---|---|
| DE | 202007004904 U1 | 7/2007 |
| DE | 102006010686 A1 | 9/2007 |
| DE | 102007052125 A1 | 5/2009 |
| EP | 1770607 A1 | 4/2007 |
| WO | 2009053432 A1 | 4/2009 |
| WO | WO-2017191059 A1 | 11/2017 |

* cited by examiner

METHOD FOR MACHINING AT LEAST ONE ELECTRICAL ENCLOSURE

CROSS-REFERENCE TO RELATED APPLICATIONS

This application is a 371 U.S. National Phase of International Application No. PCT/DE2019/100274, filed on Mar. 22, 2019, which claims the benefit of German Application No. 10 2018 109 606.2, filed on Apr. 20, 2018. The entire disclosures of the above applications are incorporated herein by reference.

BACKGROUND

This section provides background information related to the present disclosure which is not necessarily prior art.

Technical Field

The invention relates to a method for machining at least one switch cabinet. The method comprises providing of at least one switchgear cabinet which is constructed in several parts and has at least one detachably mounted component. For example, an electrical cabinet usually has an electrical cabinet frame with flat panels attached thereto, for example side walls, a door element, a roof element, and a mounting plate mounted in the electrical cabinet. The flat panels and the mounting plate are usually detachably connected to the frame, e.g. by screw connections, whereby the frame forms the supporting structure of the switch cabinet. Such a switch cabinet, consisting of a frame, flat panels attached to it and a mounting plate mounted inside the switch cabinet, is a common high volume product of a switch cabinet manufacturer.

Discussion

Switch cabinets are used to accommodate switchgear, which can be designed very differently depending on the application and can therefore also have different requirements for the structure of the switch cabinet. For example, depending on the type of switchgear, the switchgear must be cooled. For this purpose, for example, an opening must be formed in a side wall of the switchgear cabinet housing through which a cooling unit mounted on or in the side wall draws heated air from the switchgear cabinet housing and blows it back into the switchgear cabinet housing as cooled air. If the switch cabinet is to be used in a data center, for example, it may be intended that the switch cabinet is to be placed in a row of switch cabinets of the same type, whereby the switch cabinets of the row are not only mechanically connected to each other, but also often form a continuous assembly space that spans several switch cabinets and is used for the arrangement of server racks and the like, for example. For example, it is common practice that a power supply for the switchgear cabinet row is provided via a continuous busbar arrangement that extends through all the switchgear cabinets of the switchgear cabinet row in order to provide a power supply for the electrical and/or electronic components of an electrical switchgear system that are accommodated in the respective switch cabinets. Although an IT-infrastructure is not an electrical switchgear according to the linguistic usage, it shall be covered by the term electrical switchgear in order to simplify the representation of the invention.

As a consequence, the switchgear cabinet provided by the switchgear cabinet manufacturer as a standard product has to be subjected to a considerable individualization until its actual use by the end user, and this concerns both the mechanical condition of the switchgear cabinet and the switchgear incorporated in the switchgear cabinet. This has led to the fact that in the value-added chain between the switch cabinet manufacturer and the end user of the switch cabinet housing, for example a machine builder, who controls a machine with the help of the switchgear accommodated in the switch cabinet, a branch of industry has formed around the switch cabinet construction, which is specialized in obtaining standardized series switch cabinets from the switch cabinet manufacturer, equipping them with the switchgear required by the end customer and thereby individualizing the switch cabinet to the extent required in each case by mechanical, mostly machining finishing.

This individualization is often associated with the fact that the at least one removable and post-processed component of the switch cabinet, for example a flat panel or a mounting plate, is disassembled from the switch cabinet, preferably from the switch cabinet frame, and removed from the switch cabinet in order to feed the component to a machining station for individualization, for example to make openings or threaded passages in the flat panel or mounting plate.

The mounting plate is also removed from the switchgear cabinet for equipping the mounting plate with the switchgear and is manually or automatically provided with the electrical and/or electronic components of the electrical switchgear, including wiring of the components and functional testing of the switchgear. Thus at least one machining step of the detachably mounted component takes place when it has been disassembled and removed from the switch cabinet. The processed component is then made available for reassembly on the associated switchgear cabinet. In order to enable a reassignment of the processed component provided for reassembly exactly to the corresponding switch cabinet, it has been common practice so far to temporarily mark the removable components and the switch cabinet, e.g. by means of manually applied markings. This is accordingly cumbersome and error-prone.

SUMMARY

This section provides a general summary of the disclosure, and is not a comprehensive disclosure of its full scope or all of its features.

It is therefore one aspect of the invention to provide a method for the machining of at least one switch cabinet which is easy to perform and not prone to errors.

Accordingly, it is provided that the at least one switch cabinet has an individual machine-readable switch cabinet identification and the at least one removably mounted component has an individual machine-readable component identification which are assigned to each other, wherein the re-assignment of the component to the switch cabinet comprises the machine-reading of the machine-readable identifications and the bringing together of the component and the switch cabinet which have the mutually assigned identifications.

For example, at least two identical switch cabinets can be provided during provision, for example two switch cabinets that correspond to the standard product of a specific article number of a switch cabinet manufacturer. The two switch cabinets will therefore not differ from each other in their characteristics. In particular, the two switch cabinets may have a switch cabinet frame with flat panels fixed to it. The frames of the two switch cabinets, as well as the mounting plates and flat panels will therefore not differ from each other. At least one of the aforementioned detachably mounted components of the switchgear cabinet may have the switchgear cabinet identification, if necessary in addition to a component identification, if the component having the switchgear cabinet identification is a component detachably mounted on the switchgear cabinet, for example a flat panel, such as the switchgear cabinet door. Thus, each of the two series switch cabinets supplied by the switch cabinet manufacturer may have a component which has at least the switch cabinet identification. At least one component of the other components detachably mounted on the respective switch cabinet can have a component identification which is assigned to the respective switch cabinet identification.

It may also be provided that a frame of the respective switch cabinet does not have a component identification, since the frame is not processed and therefore, in case of a plurality of switch cabinets, an individual assignment of a certain frame to a certain switch cabinet, i.e. a certain switch cabinet identification, is not necessary. For consistency reasons, however, it is conceivable that the switch cabinet frame also has a component identification that is assigned to the switch cabinet identification.

The component of the switch cabinet which has the switch cabinet identification, to which the different removable mounted components of the switch cabinet are assigned by their respective component identification, thus has the function of a reference component or a master component of a certain switch cabinet, to which certain further removable mounted components of the certain switch cabinet are assigned by their respective component identification.

In this way it is possible that in the case of several identical switchgear cabinets, after dismantling the removably mounted components and, if necessary, after machining at least one of the disassembled components, those components which were originally provided before the reworking are reassembled at the same switchgear cabinet. Especially in the case of highly individually reworked switchgear cabinet components, such as flat panels of the switchgear cabinet, the previously described assignment ensures that after the machining of the disassembled components and the re-assignment of the processed components to the corresponding switchgear cabinet, exactly the components that formed the switchgear cabinet before the disassembly are actually reassembled.

Providing of the at least one switchgear cabinet can include the manufacturing of the switchgear cabinet, whereby during the manufacturing of the switchgear cabinet the removably mounted component of the switchgear cabinet with the component identification and the at least one further component of the switchgear cabinet with the switchgear cabinet identification are manufactured independently of each other and after their manufacture are assigned to each other for the first time by reading in the identifications.

The provision or the disassembly and removal of the removably mounted component of the switch cabinet may involve the generation of a first data set describing a target machining state of the component, the first data set being assigned to the component via the component identification, and the storage of the first data set for remote access.

In this way, it is also possible, for example, for the switchgear cabinet manufacturer to carry out individualization measures on the series product as early as the switchgear cabinet production stage, such as forming cut-outs in flat panels or in the mounting plate.

It is possible that the first data set describing the target machining state of the component is already transmitted to the switch cabinet manufacturer before the switch cabinet is manufactured, or during this process, for example by a switch cabinet manufacturer. Similarly, the target machining state can be transmitted in the form of a CAD design from the panel builder to the switch cabinet manufacturer, who generates the first data set from it and assigns it to the component identification of the component during the manufacture of the detachably mounted component. It may also be provided, for example, that a panel builder transmits a CAD design to the switchgear cabinet manufacturer which concerns at least the mechanical reworking of the series switchgear cabinet, for example the formation of at least one opening in at least one flat panel of the switchgear cabinet. The switchgear cabinet manufacturer can then generate from the CAD design relating to the post-processing of the switchgear cabinet a first data set for each of the components of the switchgear cabinet affected by the post-processing, or a common data set describing the target machining state of the component concerned, the respective first data set then being assigned to the respective component by means of the respective component identification, for example as soon as the respective component concerned has been manufactured in the raw production of the components of the switchgear cabinet and has been provided with the component identification individually identifying the component. It is thus possible that already in the earliest possible manufacturing process of the switch cabinet the individual components of the switch cabinet are assigned the information concerning the post-processing of the respective component via the link with the component identification. The control cabinet component can thus already be highly individualized in the raw production process, even if only by assigning a data set relating to the component to the component.

It is possible, for example, that the components of the control cabinet to be reworked compared to the series product may undergo individual reworking before they are first assembled to form a control cabinet, so that the control cabinet product delivered by the control cabinet manufacturer to the switchgear manufacturer exhibits a certain degree of individualization compared to the series product, for example in the form of cut-outs in flat panels.

But even in series production, the identification of the switch cabinet and the at least one removable component in accordance with the invention can have advantages, for example by specifying at least one manufacturing step relating to the component via the data set assigned to the component identification, for example an intended painting of the component, an intended foaming to form a sealing element, an intended sealing function for attachment in the final assembly and the like.

The generation of the first data set describing the target machining state can include the storage of at least one machining step in the first data set, which is required to transfer the component from its actual state to the target machining state. The target machining state may differ from a final machining state.

Panel fabrication may include the fabrication of the removable mounted component in volume production, but the method may still have the steps:

Capturing the component identification of the removable mounted component in volume production;

reading the first data set and detecting the target machining state or at least one machining step;

separating the detachably mounted component from the series production and feeding the detachably mounted component to a machining station, wherein in the machining station the at least one machining step and/or a further machining step is carried out to bring the detachably mounted component closer to the target machining state; and after the machining step has been carried out, reintegration of the detachably mounted component into the series production.

If the production of the switch cabinet comprises the production of the detachably mounted component in series production, wherein the detachably mounted component can pass through several machining stations, the component identification of the detachably mounted component can be read out at at least one machining station, the first data set assigned to the component identification can be recorded, taking into account the first data set and a CAD construction possibly contained therein, at least one machining step can be carried out in order to at least approximate the component to the target machining state. An updated machining state can be stored in the first data set and the first data set for remote access.

Thus, the method can also include a documentation of performed machining steps in the first data set. The first data set can thus reflect the current machining state of the component in question during the production of the component between different machining stations. This ensures that the first data set can be used to monitor the expected machining success of the removably mounted component at any time during production, i.e. an approximation to the target machining state.

The first data set may contain mechanical design information of a hole pattern for machining the detachably mounted component, such as a mounting plate or a flat panel, for example for a switchgear to be produced on the mounting plate or for the mounting of a switch cabinet air conditioner in or on a flat panel. The design information can be provided as CAD data, for example. Manufacturing the removable mounted component may involve mechanical machining of the removable mounted component, including lasers, to produce the hole pattern. For example, the assembled component may be a mounting plate that has a hole pattern to form the electrical switchgear on the mounting plate. The mounted component can be, for example, a side wall of the switchgear cabinet into which a hole pattern is inserted in order to mount a switchgear cabinet air conditioning unit on or in the side wall of the switchgear cabinet and to connect it fluidically with the interior of the switchgear cabinet.

Furthermore, the method can include the generation of a second data set, which is assigned to the switch cabinet via the switch cabinet identification and stored for remote access, whereby the second data set includes a circuit diagram of a switchgear to be created or already created in the switch cabinet. The second data set can be generated from the first data set, for example by enriching the data concerning the circuit diagram.

The unique identification of the control cabinet makes it possible to establish a clear assignment between a control cabinet and a switchgear to be created or already created in the control cabinet. Before the switchgear is created in the switchgear cabinet, the switchgear to be created in the "empty" switchgear cabinet can thus already be assigned to the switchgear to be created in it, at least in the form of a circuit diagram describing the switchgear and, if necessary, further information, such as a component parts list. This considerably simplifies the logistics of the switchgear manufacturer, who has to subject the switchgear cabinet to various post-processing operations at different machining stations of his production line in order to manufacture the switchgear.

Since the electrical switchgear is permanently assigned to the switch cabinet in which it is installed after its construction, due to the high degree of individualization of the switch cabinet, a clear identification of the switchgear can be made by means of the switch cabinet identification of the switch cabinet in which it is installed.

For example, a second data set assigned to the switch cabinet identification can be generated, which contains a circuit diagram of the switchgear accommodated in the switch cabinet. Alternatively, the second data set can contain further information concerning the switchgear, for example a component parts list, a maintenance plan or similar. This also makes it possible that in the event of a change to the switchgear or in the event of maintenance, appropriate measures, which may also include a corresponding adaptation of the circuit diagram, are documented in the second data set and stored for remote access. It is therefore no longer necessary to keep a paper circuit diagram and a paper maintenance history. Due to the fixed assignment between switch cabinet labeling and switchgear, confusion between the circuit diagram and the actual switchgear and the loss of the circuit diagram, which is quite possible with paper documentation, is also prevented. The second data set can be obtained from the first data set by modifying, in particular by enriching the first data set.

The method can also include changing the circuit diagram according to a recorded change of the switchgear and updating the second data set so that the updated second data set contains the modified circuit diagram. The recording of a change to a switchgear can be done manually via a human-machine interface or, for example, partially automated, for example with optical or component recognition.

In the case of semi-automated detection, it may be provided that all components of the electrical switchgear, or at least some of the electrical components of the switchgear, have individual component identification. This marking should preferably be contactless and preferably optically readable and can be provided in the form of a QR code, for example, but is not limited to QR codes. With the help of such a detection, e.g. optical detection, it can be determined which components the switchgear has, at least to the extent that the components are provided with a component identification. The second data set may, for example, contain a list of components of the switchgear which can be updated on the basis of the recorded components if, for example, a change in the component population of the switchgear occurs during a revision of the switchgear or during maintenance. For example, it may be intended that the recording of a change in the switchgear includes the recording of the component identifications of the components of the electrical switchgear, whereby a change in the component equipment of the electrical switchgear can be recorded by comparing the recorded component identifications with the circuit diagram.

With the help of the component identification, however, a recording of the relative arrangement of the components to each other is basically also possible beyond the provision of a parts list. For this purpose, it may be provided that the method comprises the at least partial optical or electromagnetic detection of an interior of the switchgear cabinet, in particular of a mounting side of a mounting plate on which the electrical switchgear is arranged, wherein the detection comprises the detection of at least one component identification of at least one component of the switchgear, wherein the detection comprises, in addition to the detection of the component identification, further the detection of a location information of the component relative to at least one further component of the switchgear with a further component identification. Furthermore, the acquisition can include the acquisition of a correct positioning of at least one component of the switchgear. This can include the alignment of a 2D or 3D layout with the acquired location information. The acquisition can also include the acquisition of the completeness of the electrical switchgear. A component list can be compared with the captured components.

The electrical components of the switchgear with the component identification can also include the wiring of the electrical switchgear. For example, a wire routed between a first and a second component and electrically connecting them may have a component identification at its opposite ends, with which it is connected to the first component or to the second component, so that the method can also be used to compare the wiring of the components and, if necessary, to compare the detected wiring with a wiring stored in a circuit diagram and, if necessary, to document a deviation or change. The circuit diagram can in turn be stored as a data set for remote access via the switch cabinet identification or also via a component identification of the mounting plate on which the switchgear described by the circuit diagram is formed.

The method can further include the creation of an electrical switchgear in the switch cabinet, starting from a CAD design of the switchgear, which is assigned to the switch cabinet via the switch cabinet identification, whereby data sheet information of electrical components of the electrical switchgear is linked with information about their interconnection in the electrical switchgear and is stored in a central archive database under the switch cabinet identification in at least one data set.

The method can also include the technical approve of the switchgear, whereby test and approval information of the switchgear is added to the at least one data set. If the required test and approval information is complete, a commissioning release for the switchgear can be triggered. The switchgear can then be commissioned, whereby commissioning information of the switchgear is added to the at least one data set, preferably via a human-machine interface.

The switchgear cabinet identification can thus be used during the various stages of the construction of a switchgear and even already during the manufacture of the switchgear cabinet that will house the switchgear in the future to allocate the measures required with the construction and commissioning of the switchgear to each other. In principle, it is possible to produce a complete design of the switchgear and the switchgear cabinet containing it, including information on the technical acceptance of the switchgear and the commissioning of the switchgear, before the switchgear cabinet is manufactured and before the switchgear is built, using suitable design tools such as MCAD and ECAD tools. This complete design of the switchgear can be assigned to a specific switchgear cabinet and its components by means of the unique switchgear cabinet identification and the component identifications linked to it, so that at each stage of the switchgear cabinet or switchgear, from manufacture through operation to disposal, the information required in each case from the bundle of information assigned to the identifications can be retrieved by the respective shareholder.

In this way, the method can continue to include the performance of maintenance or repair of the switchgear after commissioning of the switchgear as well as the addition of maintenance information or repair information to at least one data set stored in the archive database. The method can also include the execution of a switchgear repair, whereby a three-dimensional CAD design of the switchgear is used.

The triggering of a commissioning release can include the connection of at least one energy source to the switchgear and/or at least one connection from the switchgear cabinet to the switchgear to activate it. If commissioning is carried out after the switchgear has been given commissioning release, the at least one data set in the archive database can be further enriched with supplementary commissioning information of the electrical switchgear.

It is thus possible to create a documentation already at the time of the manufacturing of the electrical switchgear, which offers a higher depth of information than a usual switchgear cabinet folder in paper form, by not only reproducing the components installed in the switchgear, but also implementing their data sheet information in the documentation. In addition, function information linked to this can provide information about the function of a specific electrical component of the switchgear in its respective installation situation in the concrete electrical switchgear, for example the control of a frequency converter for a three-phase motor of a pump or similar.

All information concerning the switchgear can be carried along and dynamically updated over the entire product life cycle of the switchgear and the switch cabinet in which the switchgear is installed.

The method can also include the reading of the switchgear cabinet identification and the provision of a CAD design of an electrical switchgear to be formed in the switchgear cabinet, whereby the CAD design is assigned to the switchgear cabinet via the switchgear cabinet identification. The method can also include the import of the CAD design into a computer-aided assistance unit. The computer-aided assistance unit can be set up to fragment the CAD design. The CAD design can be broken down into individual assembly steps that build on each other in order to determine an efficient assembly step sequence of the electrical switchgear, for example on a mounting plate of the switchgear cabinet.

The assembly step sequence can include at least two consecutive wiring steps of two components of the electrical switchgear or at least two consecutive component positioning steps of two components of the electrical switchgear.

The computer-aided assistance unit can be set up to break down the CAD design, which has at least a three-dimensional layout and a parts list of the individual electrical components of the electrical switchgear, into individual assembly steps that build on each other.

The computer-aided assistance unit can have a tolerance evaluation device for step sequence control, with the help of which sensor-registered actual installation positions of mounted components of the switchgear can be compared with target specifications according to the circuit diagram, taking into account specified installation tolerances. The sensoric acquisition of the actual installation positions can be done optically and with the help of image processing. For easier recognition of the components by the computer-aided assistance unit, the components of the electrical switchgear can each have a component identification, so that each component marked with the component identification can be clearly distinguished from the other components.

Furthermore, the method can also include the visualization of a manually executable assembly step of the assembly step sequence by a display unit installed at an assembly site, which outputs image and/or text information as assembly instructions. The method may further include the execution of the manually executable assembly step according to the displayed image and/or text information. Furthermore, the method may include the acknowledgement of the completed assembly step via an input unit installed at the assembly site and the logging of the completion of the assembly step as well as the retrieval of a next assembly step of the assembly step sequence. At the latest after completion of all assembly steps of the assembly step sequence, a protocol data set assigned to the switch cabinet identification can be generated and stored for remote access, which has a protocol of the completed assembly steps of the assembly step sequence.

Furthermore, the method can include the configuration of an electrical switchgear for the switch cabinet, which is at least composed of several electrical and/or electronic components. The configuration may include the creation of an electrical circuit diagram of the electrical switchgear or, if already existing, the provision of the electrical circuit diagram.

Furthermore, the method may include the conversion of the electrical circuit diagram into a three-dimensional assembly layout of the switchgear cabinet interior, in particular into a three-dimensional mounting plate layout representing an arrangement of the electrical and/or electronic components on a mounting plate of the switchgear cabinet.

Furthermore, the method can comprise the modification of the three-dimensional layout to generate at least one alternative three-dimensional layout, wherein a quality function is applied which takes an extremum if the electrical switchgear is optimized with respect to a physical parameter, preferably with respect to a packing density of the electrical and/or electronic components of the switchgear, a thermal load of the switchgear, an electrical energy consumption of the switchgear, at least one cable length for the wiring of the electrical and/or electronic components of the switchgear.

Furthermore, the method may include the generation of a third data set representing the alternative three-dimensional layout, the assignment of the switchgear cabinet identification to the third data set and the storage of the third data set for remote access.

For the modification of the created three-dimensional layout into the alternative three-dimensional layout, a modification algorithm can be applied, which applies the quality function. The quality function represents the goal, which is to be achieved with the modification, for example the increase of the space utilization ratio of the electrical switchgear. If several goals are to be achieved simultaneously, compromises in the sense of a lowest common denominator can be found in case of conflicting goals. Instead of the quality function, it is also possible to specify boundary conditions that must be precisely maintained, for example a maximum temperature or maximum energy consumption of the electrical switchgear.

When disassembling and removing the at least one component from at least one switchgear cabinet, at least two components designed as identical parts can be disassembled and removed, which differ in at least one feature after machining.

The component identifications of the at least two components designed as identical parts may furthermore each be assigned to a unique and different local feature comprising an assembly position of the respective component on the switch cabinet, the re-assignment of the machined components further comprising an assignment of the machined components to their respective assembly position on the switch cabinet.

During the disassembly and removal of the component from the respectively associated cabinet, at least two identical or nearly identical components of different cabinets can be disassembled and removed.

When machining the identical or almost identical components, the components can be processed differently, so that the components differ in at least one feature after machining.

The reading of at least one of the characteristics may involve the reading of an optically readable identification, in particular a barcode or a multidimensional code, such as a QR code, and/or the reading of an electromagnetic, inductive or capacitive readable identification, in particular an RFID transponder.

Providing of the at least one switchgear cabinet may include the manufacture of the switchgear cabinet, at least one of the components being a shaped sheet metal part formed from a steel sheet blank by shaping and, if necessary, machining and/or further sheet metal working measures and, if necessary, subsequent painting. Before painting, the sheet metal shaped part may be provided with the machine-readable identification which is overpainted during the painting of the sheet metal shaped part so that the surface of the sheet metal shaped part and the component identification are covered with an uninterrupted paint layer.

Providing of the at least one switchgear cabinet may include the manufacture of the switchgear cabinet, at least one of the components being a formed sheet metal part which is formed from a steel sheet blank by shaping and, if necessary, machining measures, the machine-readable identification being printed on the formed sheet metal part with a color which is visible or invisible in the optical wavelength range.

Providing of the at least one switchgear cabinet can comprise the manufacture of the switchgear cabinet, wherein at least one of the components is a sheet metal shaped part which is formed from a steel sheet blank by shaping and optionally machining measures and optionally a subsequent lacquering, wherein a phase change material or a matrix of individual fields of a phase change material is applied to the sheet metal shaped part or optionally to the lacquering and optionally lacquered over with the lacquering of the sheet metal shaped part, wherein the phase change material or the matrix is described by thermal and/or electrical action to form the identification with the at least one feature.

Furthermore, an accessory component can be mounted on or in the at least one switch cabinet, which has a unique accessory identification which is assigned to the switch cabinet identification, wherein the accessory identification is assigned to the switch cabinet identification before, after or during the mounting of the accessory component on or in the switch cabinet. The accessory identification can be assigned a data set containing installation information of the accessory component, e.g. an installation location of the accessory identification in the switch cabinet.

The method may include providing of at least two identical components to be mounted in or on the switch cabinet, each with a component identification, whereby the component identifications of the identical components are assigned an individual location feature for differentiation from one another when the respective component is mounted in or on the switch cabinet.

The method can comprise the generation of a fourth data set which is assigned to the switch cabinet via the switch cabinet identification, the data set comprising information concerning the use of the switch cabinet, the maintenance of the switchgear accommodated in the switch cabinet and/or the intended disposal of the switch cabinet, which is taken during manufacture from the planning data stored in the database and stored in the identifiers, and/or which is added to the identifiers or updated in them as required over the life cycle of the switch cabinet.

Providing can comprise the provision of a switch cabinet with a frame and at least one flat panel, whereby the frame and/or the flat panel has an electrical contact. The electrical contact can have a protective cover with a non-volatile memory in which at least one data set relating to the frame or flat panel having the electrical contact is stored, preferably a component identification which uniquely identifies the frame or flat panel having the electrical contact. The protective cover may have a part which is firmly connected to the electrical contact and a part which is detachable from the electrical contact, the firmly connected part having the non-volatile memory. The part firmly connected to the electrical contact may be connected to the part detachable from the electrical contact via a predetermined breaking point.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention are explained using the figures below. Therein.

DETAILED DESCRIPTION

Example embodiments will now be described more fully with reference to the accompanying drawings.

Figure 1:
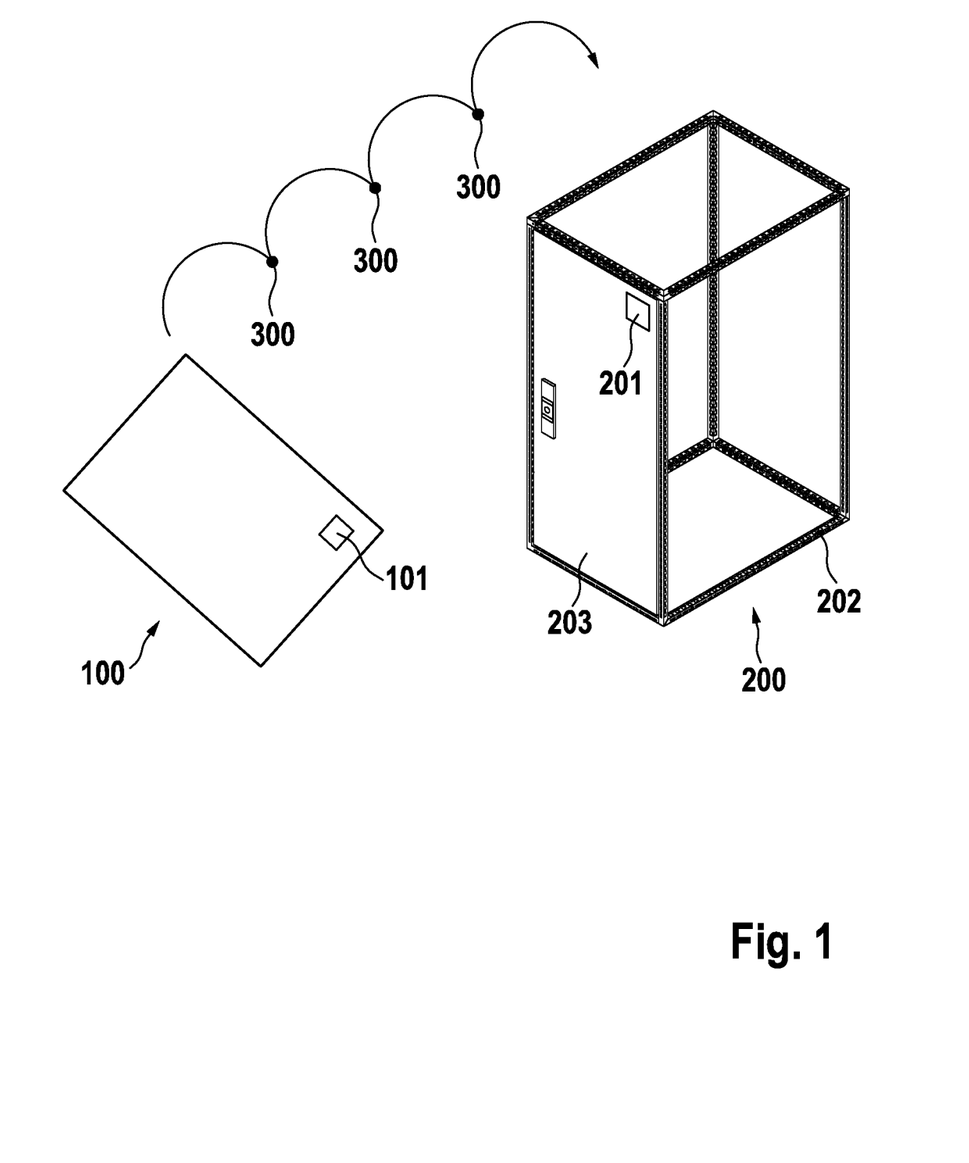
FIG. 1 schematically shows the production of a switch cabinet by an electrical cabinet manufacturer.
Figure 2:
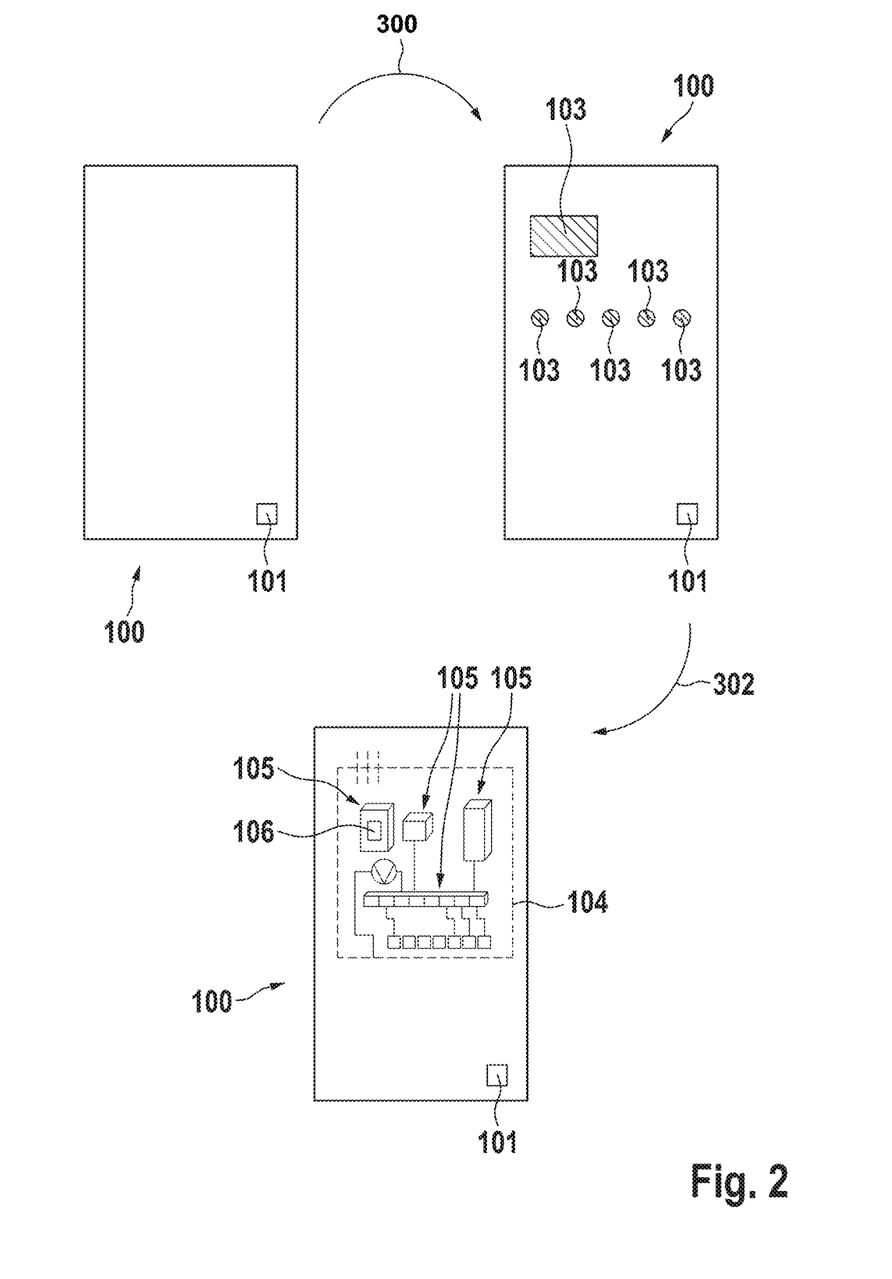
FIG. 2 schematically shows the machining of a removable part mounted on an switch cabinet at a switchgear manufacturer.
Figure 3:
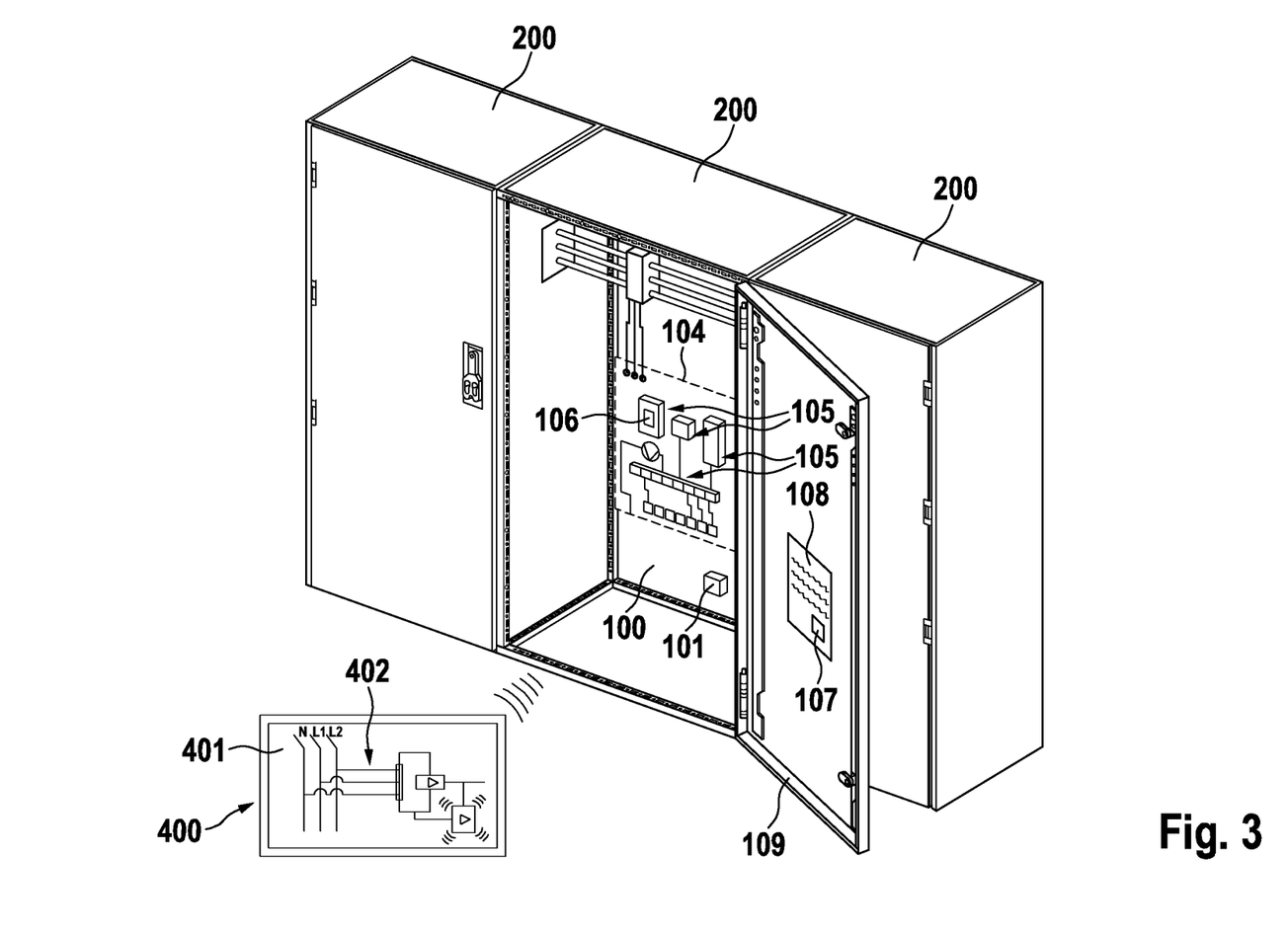
FIG. 3 shows the maintenance of electrical switchgear at the end user.

FIGS. 1 to 3 show an exemplary embodiment of a method according to the invention for the machining of at least one switchgear cabinet 200. FIG. 1 shows the manufacture of the switchgear cabinet by the switchgear cabinet builder. This includes the raw production of a flat panel 100, for example a switch cabinet side wall, a switch cabinet door, or a mounting plate. The flat panel 100 has a component identification 101, by which the flat panel 100 can be clearly identified.

It is possible that the component identification 101 is arranged on the flat panel 100 as early as possible and thus already during the unfinished production of the flat panel 100 gives the switch cabinet manufacturer the possibility to store the manufacturing information individually concerning the flat panel via a data set linked to the component identification 101. Thus, for example, it is possible that a data set is uniquely assigned via the component identification 101, which contains processing information during the manufacturing process of the flat panel 100, for example a mounting plate. This can include, for example, the insertion of cut-outs in the mounting plate already during the raw production of the mounting plate. If the flat panel 100 is to become a side panel for a switch cabinet housing 200, it is possible that already after the production of the bent sheet metal blank the component identification 101 is applied to the bent sheet metal blank. The data set linked via the component identification 101 can contain information regarding the further finishing of the sheet metal blank. This may include, for example, the application of a paint finish, a foamed gasket, or the insertion of fixing holes for mounting the flat panel on the switch cabinet. These machining steps are marked in FIG. 1 with the reference numeral 300 and are generally not limited to any specific machining steps.

Depending on the nature of the scope of the machining steps 300 with which the flat panel blank 100 is to be finished, it is necessary to design the component identification 101 in a suitable manner. If, for example, the component identification 101 is to be applied before dip coating of the flat panel 100, it is necessary that the component identification 101 can be recoated or can still be read in a recoated state. In the case of an embodiment of the invention, however, it may be provided that the component identification 101 is provided in the form of a printed QR code which can only be applied after dip coating of the flat panel 100. In this form of the invention, the painting is not one of the machining steps which can be carried out after the application of the component identification 101 and is therefore not a machining step 300 which is stored in the data set associated with the component identification 101.

Figure 4:
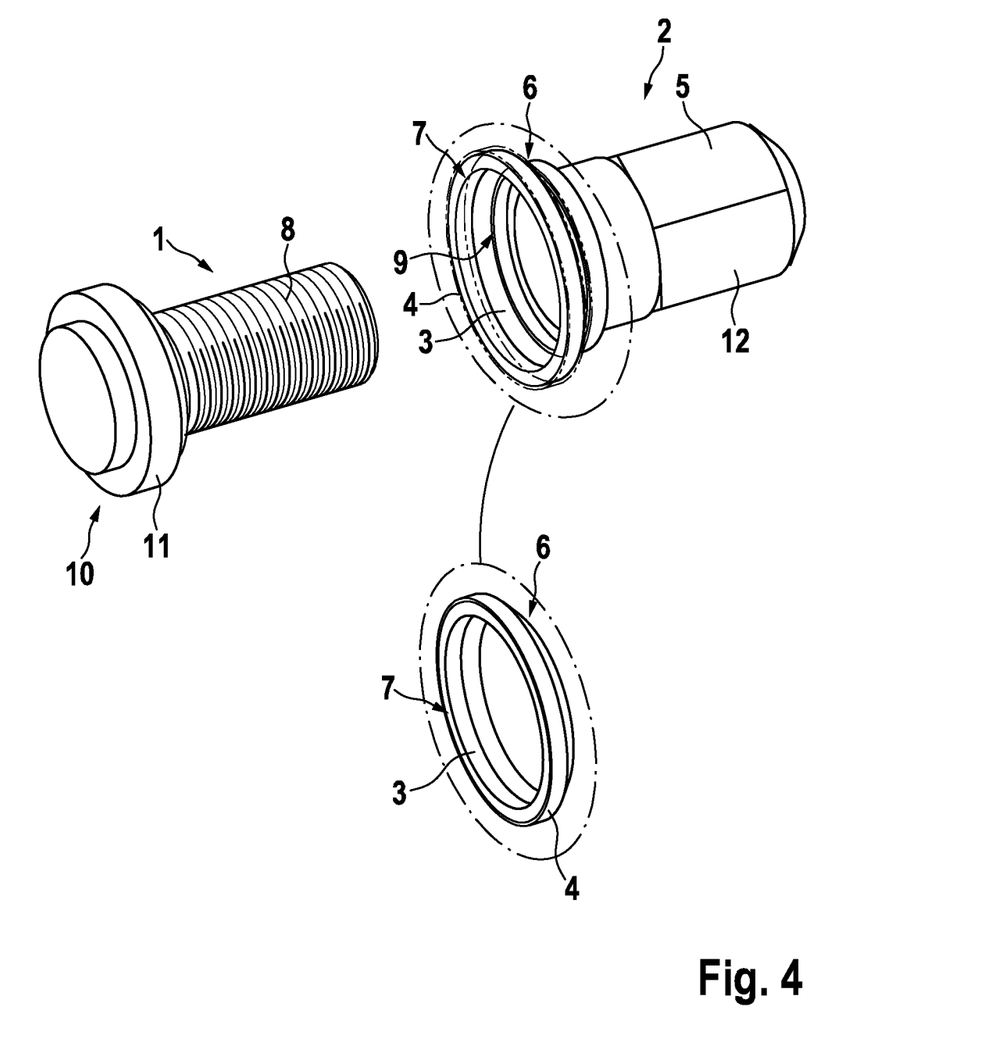
FIG. 4 shows an embodiment of a component identification.
Figure 5:
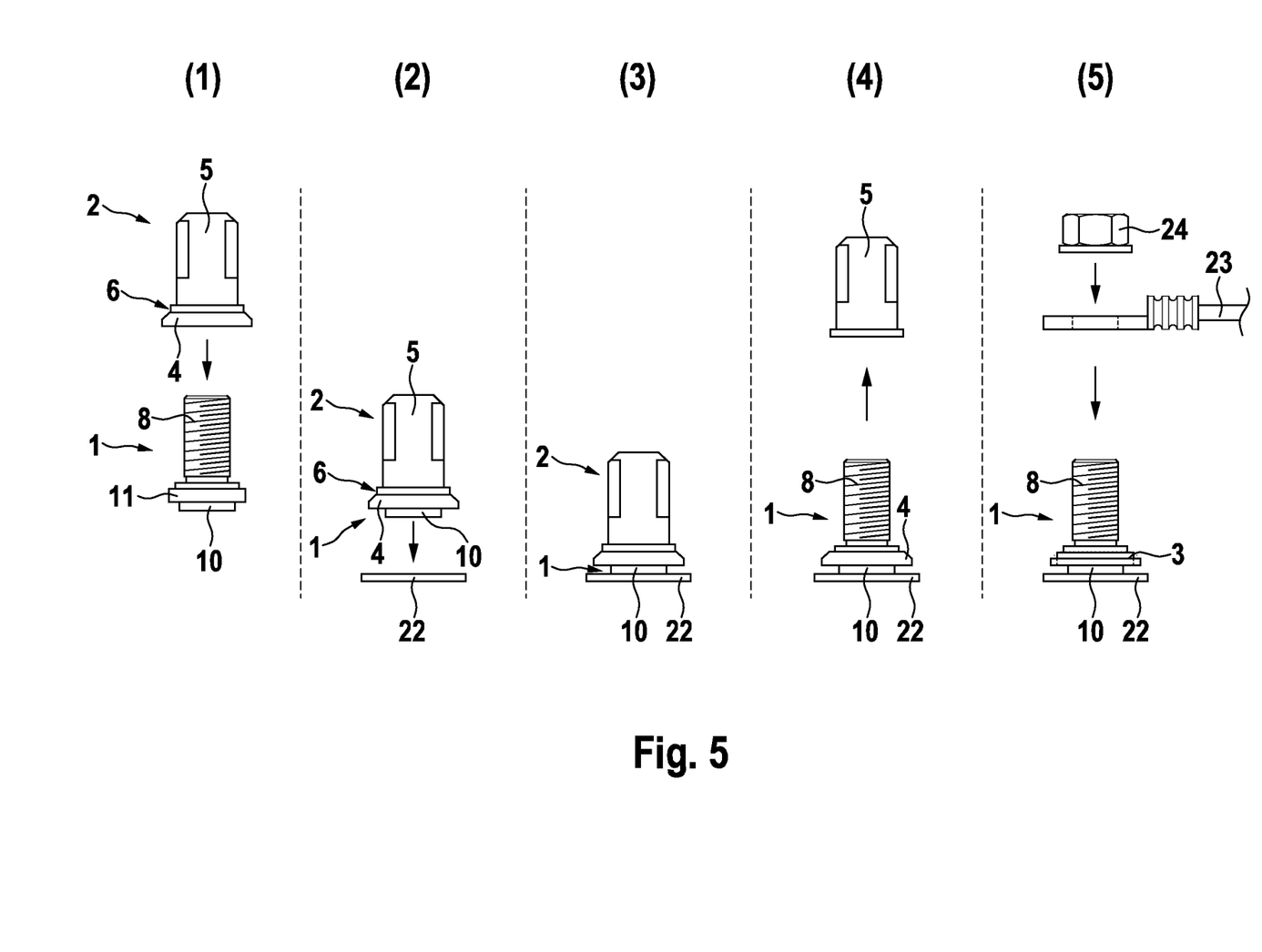
FIG. 5 shows the assembly and use of the embodiment as shown in FIG. 4.

With reference to FIGS. 4 and 5, a component identification is presented which can be applied before the flat panel is coated and is therefore still fully functional even when overcoated.

After the flat panel 100 with the part identification 101 has passed through the machining steps 300, it can be assigned to a specific control cabinet 200 via a control cabinet identification 201 on the control cabinet 200. If the part 100 is a standard series part, the assignment can be done after the flat panel 100 has been completed, i.e., after the flat panel 100 has passed all machining steps 300. If the part 100 is a part that has undergone individual machining, it may be useful to assign the part 100 to a specific control cabinet 200 or a specific control cabinet identification 201 via its part identification 101 already during its creation, especially before its individualization, so that a clear assignment between the flat panel 100 and the later control cabinet 200 is already established when the flat panel 100 is created.

It is thus possible, for example, to assign a data set to the control cabinet label 201, which contains project data of the finished control cabinet with the switchgear incorporated therein, for example MCAD data, which, among other things, relate to the post-processing of at least one detachably mounted component 100. In this case, it is useful to link the MCAD data concerning the component 100 to a specific component 100 via the component identification 101 already during the manufacturing process of the component 100.

The MCAD part number 201 itself can be located on a detachably mounted part of the cabinet 200, e.g., on a door 203, where the corresponding part 203, in this case a door, can still have a part number 201 as well as the MCAD part number 201.

The component 201 turns the component, in this case the door 203, which has the switch cabinet identification 201, into a master component, to which at least all removable components of the switch cabinet 200 with a component identification 101 are assigned by assigning the switch cabinet identification 201 to at least one component identification 101 of a component 100. All detachably mounted components, in particular all flat panels, can have a component identification 101, regardless of whether the respective detachably mounted component 100 undergoes individual post-processing or whether it is still a standard series product after completion of the switch cabinet with the switchgear mounted.

The frame 202 of the switchgear cabinet 200 is usually not subjected to any reworking and is a standardized component at least with regard to its geometry, subject to the fact that switchgear cabinets with different external dimensions and correspondingly with switchgear cabinet frames of different sizes exist.

In principle, the frame 202 can also have a component identification 101, which is assigned to the switch cabinet identification 201, which may be desired, for example, for order picking work, in order to enable a clear traceability of the frame 202 as well. It is also conceivable, for example, that the control cabinet identification 201 is formed on frame 202. After completion of the control cabinet 200, a data set can be stored via the control cabinet label 201, which reflects the product specification of the finished control cabinet 200, including, if necessary, individual machining of the cabinet by the manufacturer.

FIG. 2 illustrates the situation for the panel builder who receives from the panel builder the control cabinet 200 described with reference to FIG. 1. As has already been described with reference to FIG. 1, the enclosure supplied to the panel builder by the panel builder can be a series product, or a 200 panel enclosure which, according to project data supplied to the panel builder by the panel builder, already has a certain degree of individualization, e.g. cut-outs in side panels for the installation of an air conditioning unit or the like.

The panel builder will therefore remove at least the mounting plate 100 from the switch cabinet housing 1 to form the switch cabinet 104. Accordingly, in FIG. 2, the detachably mounted component 100 with component identification 101 represents a mounting plate. A machining step of the mounting plate 100, after it has been disassembled and removed from the switchgear housing 200 by the panel builder, is to form openings 103 in the mounting plate 100 which are necessary for the formation of the switchgear on the mounting plate 100, e.g. for the cable routing or for the air routing of cooling air. However, as already described with reference to FIG. 1, the openings 103 can in principle also be formed at the switchgear cabinet manufacturer's premises, which is achieved precisely by the data continuity between trades, which is made possible precisely by the unambiguous component and switchgear cabinet identification of the type specified in the invention.

A further processing step 302 comprises the equipping of the mounting plate 100 with electrical and/or electronic components 105 and the wiring of the components to each other. Corresponding parts lists, a circuit diagram, a wiring diagram and further auxiliary assembly information can in turn be assigned via the component identification 101. For example, the panel builder can be supported in the assembly of the mounting plate and the wiring of the components by reading in the identification 101 and retrieving a data set linked to the component identification 101, for example with the aid of "Augmented Reality". For improved machine recognition of components 105 on the mounting plate 100, components 105 can have a machine-readable component identification 106. For example, by reading in the component identification 101, a data set can be transferred to a human-machine interface which displays a circuit diagram linked to the component identification 101. Reading in the component identification 106 serves to illustrate to a fitter the correct arrangement and wiring of the respective component 106 on the mounting plate.

FIG. 3 illustrates the situation for the end user of the electrical switchgear. There, the switchgear cabinet 200 containing the switchgear 104 may be lined up in a row of several switchgear cabinets 200. The switchgear 104 on the mounting plate 100 at the switchgear manufacturer's site as shown in FIG. 2 is located in the middle switchgear cabinet 200 in the illustration in FIG. 3. The end user of the electrical switchgear 104 is particularly interested in ensuring the operation of the switchgear and the maintenance of the switchgear by the simplest possible technical means. Here, too, the component identification in accordance with the invention can be of assistance.

For example, the end user of the electrical switchgear can read in the component identification 101 during operation of the electrical switchgear. The operating parameters of the electrical switchgear 104 are stored in a data set assigned to the component identification 101. This can include, for example, the retrieval of fault messages or the monitoring of the switchgear operation, for example the output of at least one energy consumption value.

If the electrical switchgear 104 has a monitoring unit which monitors the operation of the electrical switchgear 104 and corresponding operating parameters are stored in the data set which can be retrieved via the component identification 101, the user of the electrical switchgear can retrieve the operating parameters recorded by the monitoring unit via a man-machine interface 400 by reading the identification 101, for example with the aid of an optical camera module of the man-machine interface 400. The corresponding data set can be stored in a cloud, which the human-machine interface accesses. In the representation shown in FIG. 3, a circuit diagram 402 of the electrical switchgear 104 is shown on a display 401 of the man-machine interface 400. The data set of the switchgear monitoring device can be superimposed on the circuit diagram, so that, for example, operationally relevant parameters of the individual components of the electrical switchgear 104 can be displayed in the circuit diagram 402 on the display 401 assigned to corresponding component symbols, which considerably facilitates the maintenance of the electrical switchgear 104.

On the inside of the switchgear cabinet door 109 a circuit diagram pocket 108 with a further identification 107 can be arranged. Via the identification 107 a data set can be deposited analogous to the component identification 101, which shows essential operating parameters of the electrical switchgear 104. Furthermore, the data set can contain a circuit diagram, a component parts list, physical operating parameters of the individual components, a maintenance history of the electrical switchgear and further information, which is usually kept in a classical paper circuit diagram folder, as well as additional information, such as commissioning information of the electrical switchgear.

FIG. 4 shows an exemplary embodiment of a repaintable component identification, which is designed as an electrical contact. It features a weld-on stud 1 with an external thread 8 and a socket 10. Via the socket 10, weld-on stud 1 can be welded to a flat panel 100 as shown in FIG. 1 and thus also electrically connected. Welding can be carried out before painting the switch cabinet housing or the flat panel. The base 10 has an undercut contour 11 on its outer circumference which can be used to form a joining connection between the weld-on stud 1 and the protective cover 2 also shown.

The protective cover 2 can be designed in the form of a plastic cap, for example. In deviation from the paint protection caps known from the state of the art, the protective cover 2 shown has a part 4 at the bottom edge of the protective cover 2 which can be firmly connected to the electrical contact 1 and a part 5 which can be detached from the electrical contact 1. The paint protection caps known from the state of the art are one-piece. Part 5, which can be detached from electrical contact 1, can, for example, have an internal thread corresponding to the external thread 8, via which part 5 can be screwed onto contact 1. However, part 5, which can be detached from electrical contact 1, can also be designed in the manner of a cap without internal thread, which is held on the weld-on stud 1 only via its predetermined breaking point and the firmly connected part 4. Part 4, which is firmly connected to the weld-on stud 1, may, for example, be joined to contact 1 via the undercut 11 at the base of contact 1.

The firmly connected part 4 has the non-volatile memory 3 for storing a component identification. Part 4, which is firmly connected to weld-on stud 1, is connected to part 5, which can be detached from weld-on stud 1, via a predetermined breaking point 6. The non-volatile memory 3 is a wireless readable memory 3, for example an RFID transponder. An antenna 7 of the wirelessly readable memory 3 is located along the outer circumference of the electrical contact 1 when the protective cover 2 is placed on the contact, for example by joining the fixed part 4 to the socket 10. As the antenna 7 extends along the outer circumference of the socket 10, it is not electromagnetically shielded by the weld-on stud 1, which is a metal part. The antenna 7 can be embedded in the firmly connected part 4. Accordingly, the material of the firmly connected part 4 does not have a significant electromagnetic shielding effect and is, for example, a plastic material.

The protective cover 2 has a cover part 12 which is connected at its free edge 9 via a predetermined breaking point 6 to the part 4 of the protective cover which can be firmly connected to the base 10 of the grounding bolt.

Since the non-volatile storage tank 3 with at least one data set, e.g. a component identification, is located in the part 4 of the protective cover 2 that can be firmly connected to the electrical contact, the storage tank 3 remains on the switch cabinet housing when the cover part 12 is detached from the fixed part 4 via the predetermined breaking point 6 and the cover part 12 is removed. This means that the information stored in memory 3 is retained even if, for example, the cover part 12 of the protective cover 2 is unscrewed or released from the thread 8 of the electrical contact and removed from the switch cabinet housing to establish an earth contact for equipotential bonding.

FIG. 5 illustrates an exemplary manufacturing and application process of weld-on stud 1. In a first step, weld-on stud 1 can be manufactured by connecting it to protective cover 2 consisting of the permanently connectable part 4 and the detachable part 5 in one joining step with weld-on stud 1.

Subsequently, the weld-on stud 1 provided with the protective cover 2 can be connected to a flat panel 22 of a switch cabinet housing via a welding process. If the protective cover 2 is then removed from the electrical contact, whereby the weld-on stud 1 is at least partially exposed and the non-volatile accumulator 3 remains at the electrical contact 1, an electrical connection to the switch cabinet housing or the flat panel 22 can be established by contacting the electrical contact 1 with a protective conductor 23. The protective conductor 23 may have a wire eyelet which is placed on the threaded section 8 of the weld-on stud 1 and locked with a nut 24. For improved illustration, FIG. 5 shows the farthest right artial representation without the outer casing of the fixed part 4, so that the non-volatile storage device 3 still remaining at the electrical contact 1 after removal of the detachable part 5 is visible in the fixed part 4, even if in the concrete application it is protectively accommodated within a plastic casing of the fixed part 4, as shown from the right in the second illustration.

The features of the invention disclosed in the above description, in the drawings as well as in the claims may be essential for the realization of the invention either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for machining at least one switchgear cabinet, comprising:
   providing the at least one switchgear cabinet which is constructed in several parts and comprises at least one removably mounted component;
   disassembling and removing the at least one removably mounted component from the at least one switchgear cabinet;
   machining the at least one disassembled and removed component and providing the at least one machined component for reassembly on an associated switchgear cabinet; and
   re-assigning the at least one machined component provided for reassembly to a corresponding control cabinet,
   Wherein the at least one switchgear cabinet has an individual machine-readable switchgear cabinet identification and the at least one removably mounted component has an individual machine-readable component identification, which are assigned to one another, wherein re-assigning of the at least one machined component to the at least one switchgear cabinet comprises machine-reading of the machine-readable component identifications and bringing together the at least one machined component and the at least one switchgear cabinet which have mutually assigned identifications.

2. The method according to claim 1, in which providing of the at least one switchgear cabinet comprises manufacturing of the at least one switchgear cabinet, wherein during manufacturing of the at least one switchgear cabinet the at least one removably mounted component of the at least one switchgear cabinet with the machine-readable component identification and the at least one further component of the at least one switchgear cabinet with the individual machine-readable switchgear cabinet identification are manufactured independently of one another.

3. The method according to claim 1, in which providing or disassembling and removing of the at least one removably mounted component of the at least one switchgear cabinet comprises generating a first data set describing a desired machining state of the at least one removable component, the first data set being assigned to the at least one removable component via the individual machine-readable component identification, and storing the first data set for remote access.

4. The method according to claim 3, wherein generating the first data set describing the desired machining state comprises storing of at least one machining step in the first data set which is required to transfer the component from its current state to the desired machining state.

5. The method according to claim 3, in which manufacturing of the at least one switchgear cabinet comprises the manufacturing of the at least one removably mounted component in series production, the method further comprising:
   detecting the individual machine-readable component identification of the at least removably mounted component in series production;
   reading the first data set and detecting the desired machining state or at least one machining step;
   separating a detachably mounted component from the series production and feeding the detachably mounted component to a machining station, wherein in the machining station the at least one machining step and/or a further machining step is carried out in order to bring the detachably mounted component closer to the target desired machining state; and
   after the machining step has been carried out, reintegrating the detachably mounted component into series production.

6. The method according to claim 3, in which manufacturing of the at least one switchgear cabinet comprises manufacturing of the removably mounted component in the series production, the removably mounted component passing through a plurality of machining stations, wherein in at least one machining station of the plurality of machining stations
   the individual machine-readable component identification of the detachably mounted component is read out;
   the first data set assigned to the component identification is recorded;
   at least one machining step is performed to bring the component closer to a desired machining state;
   an updated machining state is stored in the first data set; and
   the first data set is stored for remote access.

7. The method according to claim 3, in which the first data set comprises mechanical design information of a hole pattern for a switchgear to be produced in the at least one switchgear cabinet or for the assembly of a switchgear cabinet air conditioner, preferably MCAD data, wherein production of the removably mounted component comprises mechanical processing, including lasering, of the removably mounted component, preferably a mounting plate of the at least one switchgear cabinet, for producing a hole pattern.

8. The method according to claim 1, which further comprises generating a second data set which is assigned to the at least one switch cabinet via the individual machine-readable switch cabinet identification and is stored for the remote access, wherein the second data set comprises a circuit diagram of a switchgear to be produced or already produced in the at least one switch cabinet, and wherein the second data set can be obtained from the first data set by modification, preferably by enrichment of the first data set.

9. The method according to claim 8, further comprising changing the circuit diagram according to a detected change of the switchgear and updating the second data set so that the updated second data set comprises the changed circuit diagram.

10. The method according to claim 9, in which the detection of the change in the switchgear comprises a detection of component identifications of components of an electrical switchgear, wherein a change in a component assembly of the electrical switchgear is detected by comparing the detected component identifications with a circuit diagram.

11. The method according to claim 10, further comprising detecting an interior of the at least one switchgear cabinet at least partially optically or electromagnetically, preferably detecting a mounting side of a mounting plate on which the electrical switchgear is arranged, wherein detecting comprises detecting of at least one component identification of at least one component of the electrical switchgear, the detecting further comprising, in addition to detecting the at least one component identification, detecting a location information of the at least one component of the at least one switchgear cabinet relative to at least one further component of the at least one switchgear cabinet with a further component identification.

12. The method according to claim 1, further comprising:
   creating an electrical switchgear in the at least one switchgear cabinet starting from a CAD design of the electrical switchgear which is assigned to the at least one switchgear cabinet via the individual machine-readable switchgear cabinet identification, wherein data sheet information of electrical components of the electrical switchgear is linked with information on their interconnection in the electrical switchgear and is stored in a central archive database under the individual machine-readable switchgear cabinet identification in at least one data set; and
   technically approving the electrical switchgear, whereby test and approval information of the electrical switchgear is added to the at least one data set, whereby a commissioning release for the at least one switchgear cabinet is triggered if necessary test and approval information is complete in at least one data set; and
   commissioning of the electrical switchgear, whereby commissioning information of the electrical switchgear is added to the at least one data set via a human-machine interface.

13. The method according to claim 1, which further comprises:
   reading in the individual machine-readable switchgear cabinet identification and providing a CAD construction of an electrical switchgear to be formed in the at least one switchgear cabinet, the CAD construction being assigned to the at least one switchgear cabinet via the individual machine-readable switchgear cabinet identification, and reading in the CAD construction into a computer-aided assistance unit; and
   fragmenting of the CAD design into individual assembly steps which build on one another by the computer-aided assistance unit for determining an efficient assembly step sequence, wherein the assembly step sequence comprises at least two successive wiring steps of in each case two components of the electrical switchgear or at least two successive component positioning steps of in each case two components of the electrical switchgear.

14. The method according to claim 13, which further comprises:

visualizing a manually executable assembly step of the assembly step sequence by a display unit installed at an assembly site which outputs image and/or text information as assembly instructions;

performing the manually executable assembly step according to the displayed image and/or text information; and acknowledging the performed assembly step via an input unit installed at the assembly site and logging the completion of the assembly step and calling up the next assembly step of the assembly step sequence, wherein, at the latest after execution of all assembly steps of the assembly step sequence, a protocol data set assigned to the individual machine-readable switch cabinet identification is generated and stored for the remote access, which has a record of the performed assembly steps of the assembly step sequence.

15. The method according to claim 1, which further comprises the configuration of an electrical switchgear for the at least one switchgear cabinet, which is composed at least one of a plurality of electrical and/or electronic components, wherein the configuration comprises the steps:

preparing an electrical circuit diagram of the electrical switchgear;

converting the electrical circuit diagram into a three-dimensional assembly layout of an interior of the switch cabinet, preferably a three-dimensional mounting plate layout representing an arrangement of the at least one of the plurality of electrical and/or electronic components on a mounting plate of the at least one switch cabinet;

modifying the three-dimensional layout produced to generate at least one alternative three-dimensional layout, wherein a quality function is applied which assumes an extremum if the electrical switchgear is optimized with respect to a physical parameter, preferably with respect to a packing density of the at least one of the plurality of electrical and/or electronic components, a thermal load on the electrical switchgear, an electrical energy consumption of the switchgear, a cable length for wiring the electrical and/or electronic components; and creating a third data set representing the alternative three-dimensional layout, assigning the individual machine-readable switchgear cabinet identification to the third data set and storing the third data set for remote access.

* * * * *